United States Patent
Nybo et al.

(10) Patent No.: US 9,595,999 B2
(45) Date of Patent: Mar. 14, 2017

(54) METHOD FOR DATA TRANSMISSION BETWEEN A PUMP ASSEMBLY AND A CONTROL DEVICE, AS WELL AS A CORRESPONDINGLY DESIGNED PUMP SYSTEM

(75) Inventors: Peter Jungklas Nybo, Randers (DK); Jorgen Jensen, Langa (DK)

(73) Assignee: Grundfos Management a/s, Bjerringbro (DK)

( * ) Notice: Subject to any disclaimer, the term of this patent is extended or adjusted under 35 U.S.C. 154(b) by 1542 days.

(21) Appl. No.: 11/996,997

(22) PCT Filed: Jul. 15, 2006

(86) PCT No.: PCT/EP2006/006939
§ 371 (c)(1),
(2), (4) Date: Jan. 28, 2008

(87) PCT Pub. No.: WO2007/014638
PCT Pub. Date: Feb. 8, 2007

(65) Prior Publication Data
US 2009/0052281 A1    Feb. 26, 2009

(30) Foreign Application Priority Data

Jul. 29, 2005  (EP) .................................. 05016487

(51) Int. Cl.
*E21B 47/12*  (2012.01)
*H04B 3/54*  (2006.01)

(52) U.S. Cl.
CPC ....... *H04B 3/54* (2013.01); *H04B 2203/5416* (2013.01); *H04B 2203/5483* (2013.01); *H04B 2203/5491* (2013.01)

(58) Field of Classification Search
CPC ..... E21B 47/12; E21B 43/128; G01V 11/002; G01V 3/34; H04B 1/1027;
(Continued)

(56) References Cited

U.S. PATENT DOCUMENTS 4,471,399 A    9/1984  Udre
4,479,215 A   10/1984  Baker
(Continued)

FOREIGN PATENT DOCUMENTS

CN    85109114 A     6/1987
DE    41 28 390 C1  12/1992
(Continued)

OTHER PUBLICATIONS

English language translation of Chinese First Office Action for CN 200680027954.5, Feb. 1, 2011 (13 pages).

*Primary Examiner* — Kipp Wallace
(74) *Attorney, Agent, or Firm* — Panitch Schwarze Belisario & Nadel LLP

(57) ABSTRACT

A method for data transmission between a pump assembly (2) and a control device (8) is provided, wherein the pump assembly (2) for the energy supply is connected via at least one electrical supply lead (10) to a frequency converter (14). The data transmission is effected via the electrical supply lead (10), and an evaluation of a data transmission signal (34) received by the pump assembly (2) or the control device (8) is only effected in low-disturbance regions of a carrier signal (22) formed by a supply current. A pump system designed for carrying out this method is also provided.

8 Claims, 6 Drawing Sheets

(58) Field of Classification Search
CPC .... H04B 2203/5466; H04B 2203/5475; H04B 3/54; H04B 3/542; H04B 3/546; H04B 3/548; H04L 25/08
USPC .............. 340/853.7, 855.8; 367/81; 702/190
See application file for complete search history.

(56) References Cited

U.S. PATENT DOCUMENTS

| | | | | |
|---|---|---|---|---|
| 4,788,545 | A * | 11/1988 | Farque | 340/854.9 |
| 5,067,114 | A * | 11/1991 | Rorden | 367/81 |
| 5,158,436 | A | 10/1992 | Jensen et al. | |
| 5,488,352 | A * | 1/1996 | Jasper | 340/431 |
| 5,532,944 | A * | 7/1996 | Battista | 708/3 |
| 6,658,507 | B1 * | 12/2003 | Chan | 710/100 |
| 6,771,775 | B1 * | 8/2004 | Widmer | 379/413.04 |
| 7,680,600 | B2 * | 3/2010 | Carnegie et al. | 702/17 |
| 2003/0174450 | A1 | 9/2003 | Nakajima et al. | |
| 2003/0190038 | A1 * | 10/2003 | Das et al. | 379/386 |
| 2004/0005009 | A1 * | 1/2004 | Taghizadeh-Kaschani | 375/259 |
| 2004/0155794 | A1 * | 8/2004 | Gardner | 340/855.7 |
| 2005/0060624 | A1 * | 3/2005 | Moore et al. | 714/727 |
| 2006/0006828 | A1 * | 1/2006 | Kimura et al. | 318/716 |
| 2006/0171326 | A1 * | 8/2006 | Durand et al. | 370/252 |
| 2006/0267757 | A1 * | 11/2006 | Lee | 340/538.12 |
| 2006/0268959 | A1 * | 11/2006 | Kim et al. | 375/130 |
| 2007/0222491 | A1 * | 9/2007 | Buchner et al. | 327/170 |
| 2008/0272932 | A1 * | 11/2008 | Booker et al. | 340/854.9 |

FOREIGN PATENT DOCUMENTS

| | | |
|---|---|---|
| DE | 42 30 046 A1 | 3/1994 |
| DE | 100 26 931 A1 | 10/2001 |
| DE | 100 59 219 C1 | 6/2002 |
| EP | 0 998 053 A3 | 1/2002 |
| GB | 2 394 631 A | 4/2004 |
| JP | 61-39635 A | 2/1986 |

* cited by examiner

Fig. 2
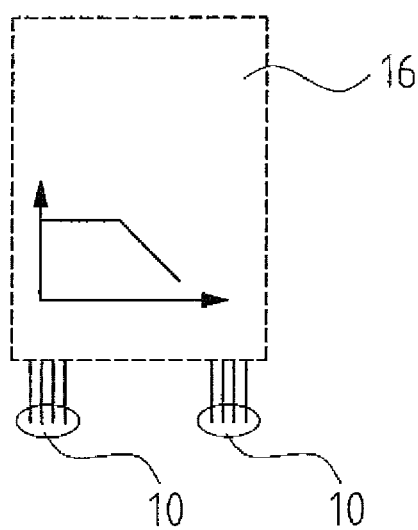
a 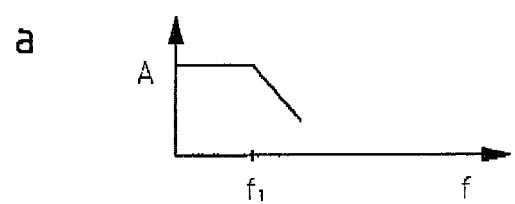
b 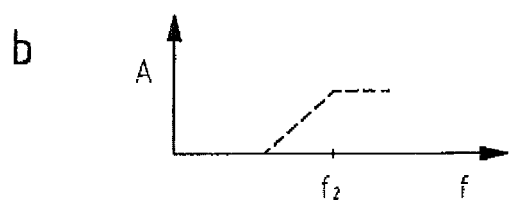
c 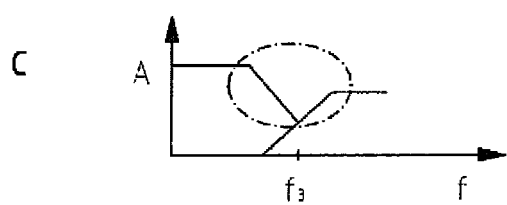

METHOD FOR DATA TRANSMISSION BETWEEN A PUMP ASSEMBLY AND A CONTROL DEVICE, AS WELL AS A CORRESPONDINGLY DESIGNED PUMP SYSTEM

CROSS-REFERENCE TO RELATED APPLICATIONS

This application is a Section 371 of International Application No. PCT/EP2006/006939, filed Jul. 15, 2006, which was published in the German language on Feb. 8, 2007, under International Publication No. WO 2007/014638 A1, the disclosure of which is incorporated herein by reference.

BACKGROUND OF THE INVENTION

The invention relates to a method for data transmission between a pump assembly and a control device, as well as to a correspondingly designed pump system with a pump assembly and a control device which is spatially separated from the assembly.

In particular, submersible pump systems are often designed such that a pump assembly is provided, which is inserted into a drill hole or a pump sump, while the associated control device is arranged in a spatially distanced manner outside the drill hole or pump sump. A data transmission between the pump assembly and the control device is therefore necessary for control and monitoring.

Furthermore, in more recent times, increasing numbers of pump assemblies are controlled in their rotational speed and thus their power via frequency converters. With submersible pumps, these frequency converters are often arranged in the vicinity of the control device, i.e., are likewise spatially distanced from the pump assembly. Thereby, the control device controls the frequency converter such that this produces the desired frequency of the supply voltage, in order to be able to operate the pump at a defined rotational speed. Thereby, certain data, which are acquired in the pump assembly itself, for example temperatures, etc., are taken into account. In order to be able to transfer these data from the pump assembly to the control device, a separate data lead is required, which renders the complete pump system more expensive and increases the installation effort.

BRIEF SUMMARY OF THE INVENTION

It is therefore an object of the invention to provide an improved method for data transmission between a pump assembly and a control device, for the case that the pump assembly is operated via a frequency converter, wherein the method should permit a simplified construction of the complete pump system.

The method according to the invention relates to a data transmission between a pump assembly and a control device arranged in spatially distanced manner. Such an arrangement is, for example, the case with submersible pumps, wherein the pump assembly is arranged in the pump sump or a drill hole, while the control device is arranged at the surface outside the pump sump. Furthermore, the method relates to a data transmission for such pump systems, wherein the energy supply of the pump assembly is effected via a frequency converter, which is connected to the pump assembly via an electrical supply lead. Thereby, the frequency converter as a rule is arranged spatially distanced to the sunk pump assembly in the vicinity of the control device, indeed on account of its size. The inventive method for the data transmission simplifies the data transmission, in a manner such that the data transmission is not effected via a separate data lead, but via the electrical supply lead, which connects the pump assembly to the frequency converter. Additional leads are avoided in this manner, which lowers the cost of the pump system and reduces the installation effort.

Thereby, the data transmission is effected in a manner such that an evaluation of a data transmission signal received by the pump assembly or the control device only takes place if the data transmission is effected in a low-disturbance region of the carrier signal, on which the data are transmitted in the supply lead. This carrier signal is formed by the supply current or the supply voltage in the supply lead, i.e., here it is the case of the output signal produced by the frequency converter.

Apart from the desired operating frequency of the supply voltage, frequency converters produce a multitude of undefined harmonics and interference frequencies, in particular on switching on and off their electrical power switches. According to the invention therefore, the data transmission is carried out such that this only takes place in regions in which such disturbances are not given. Accordingly, the complete data transmission or alternatively only the data evaluation is deferred, given occurring disturbances, in order to be able to receive faultless, undistorted data.

Thereby, the disturbance-free regions of the carrier signal may be certain frequency regions, in which no or only minimal disturbances occur. Alternatively, with regard to this, it may be the case of temporal regions or sections of the carrier signal in which no or minimal disturbances occur. These in particular are the temporal regions in which no switching procedures of the power switches of the frequency converter are carried out. The data transmission and/or the data evaluation is accordingly deferred during the switching procedures, so that data are only transmitted and/or received when the power switches cause no disturbance of the signal.

Preferably, the data transmission and/or the evaluation of the received data transmission signal is deferred at the time of occurring disturbances of the carrier signal, or the evaluation is effected in a manner such that the data transmission signal is separated from the occurring disturbances of the carrier signal by way of signal separation. The method, with regard to deferring or interruption of the evaluation of the data transmission signal, may be designed such that it is indeed the sender, i.e., the control device or the pump assembly, depending on the direction of the transmitted data, which recognizes the disturbances, and sends out no data transmission signal in the regions in which disturbances occur, in particular in the time in which disturbances occur. It may alternatively be the case that the data transmission signal is continuously sent by the sender, and only the receiver, which is the pump assembly or the control device depending on the direction of the data transmission, recognizes the regions, i.e., in particular time periods, in which disturbances occur and does not carry out any evaluation of the data transmissions signal in this time, and only continues with the evaluation when the disturbance is past. Alternatively, it is possible to separate the disturbances from the data transmission signal by way of suitable filtering, so that the data transmission signal may also be correctly evaluated in the regions of occurring disturbances. The signal separation between the disturbances and the data transmission signal may, for example, be effected in a manner such that a longer period of time of the transmitted signal is observed, in that despite the disturbances, the preferably digital data transmission signal may then be recognized by way of its bit pattern.

For the case in which a signal separation takes place, by way of which the data transmission signal is separated from occurring disturbances of the carrier signal, this is preferably effected in a manner such that disturbances, whose temporal duration is smaller than the temporal duration of a smallest information unit to be transmitted in the course of the data transmission, are ignored with the evaluation of the signal for the data transmission. The data transmission is preferably effected in a digital manner, wherein 1 bit is preferably represented in the form of a plurality of periods or oscillations. These, for example, are 256 periods for 1 bit. Here, a differentiation between disturbance and the transmitted bits may be made, since the occurring disturbances as a rule are significantly shorter, i.e., last for a lower number of periods.

The data transmission between the control device and the supply lead is preferably effected via an inductive or capacitive coupling. A simple coupling in and/or out of the signal from the supply lead is possible in this manner, without the electrical power which is transmitted in the supply lead for operation of the pump assembly, having to be led through the control device.

The data transmission and/or the evaluation of the data transmission signal is preferably deferred at the moment of the switching on and off of the power switches of the frequency converter. Harmonics and disturbances in the output signal of the frequency converter occur at the points in time of switching on and off the power switches of the frequency converter. The data transmission or evaluation of the data transmission signal is deferred, in order to render these disturbances harmless for the data transmission. The points in time may either be set by the control device which controls the power switches of the frequency converter, or however by evaluation of the carrier signal, i.e., of the output signal of the frequency converter. The possibility of setting the points in time by the control device for switching the power switches is particularly favorable, if the data transmission from the control device to the pump assembly is to be deferred. A data transmission which is independent of the respective frequency converter is possible if the points in time for deferring the data transmission are taken directly from the frequency course of the output signal of the frequency converter. This has the advantage that the pump assembly may be combined with any frequency spectrum.

In this manner, particularly the times in which disturbances of the carrier signal occur, may be automatically recognized, and the data transmission and/or the evaluation of the data transmission signal deferred during these times. This procedure has the advantage that the devices for the data transmission do not necessarily have to cooperate with the control device which actuates the power switches of the frequency converter, in order to interrupt the data transmission at the desired points in time. Rather, the data transmission may be effected alone on account of the evaluation of the carrier signal.

For this purpose, the times in which disturbances of the carrier signal occur, are further preferably recognized by analysis of an electrical variable, in particular frequency analysis or phase detection of the signal transmitted in the supply lead. This may be effected in different ways of signal analysis. For example, a frequency analysis may be effected, which detects the change of polarity of the amplitude, as well as the period duration, and recognizes the occurring disturbances in a manner such that changes in the frequency course, which are caused by disturbance, are differentiated from changes on account of the signal transmission. For example, the period duration of the occurring disturbances may be shorter than the period duration which is produced by the data signal to be transmitted, i.e., the frequency of the data transmission is smaller than the frequency of the occurring disturbances. Alternatively, a phase detection may be carried out in a manner such that a reference signal as well as a modulated signal, which forms the data transmission signal, are compared with one another or superimposed on one another. The phase shifts, which occur on account of the disturbances, may be differentiated from the phase shifts on account of the transmitted signal and may be separated from one another by way of suitable filters.

The reference signal and the modulated signal are preferably transmitted via the supply lead in a three-conductor system, in order to have the reference signal and a modulated signal available for the evaluation or analysis. In this manner, one may carry out a very simple evaluation or analysis of these two signals. Alternatively, it is also possible to transmit only the modulated signal in a two-conductor system, and to determine the reference signal from this by calculation.

According to a further preferred embodiment, the data transmission is effected in a low-disturbance frequency region of the carrier signal, wherein preferably a minimization of disturbances is effected by an electrical filter arranged between the frequency converter and the pump assembly. This means that a filter is arranged behind the frequency converter, in order to damp the disturbing harmonics. The signal transmission is then preferably effected in that frequency region in which the largest damping occurs, i.e., the disturbances are largely eliminated or at least greatly minimized. The advantage with this embodiment is the fact that such a filter is often used in any case when using frequency converters, in order not to burden the motor with the harmonics produced by the frequency converter.

It is essential for this variant of the invention to determine the frequency region in which the filter produces the greatest damping. For this purpose, the frequency region in which the data transmission is effected is set at the control device and/or at the pump assembly, in dependence on the applied filter. This is to say that a basic setting must be carried out at the control device and/or the pump assembly, depending on the applied filter, in a manner such that the frequency region in which the filter has the greatest damping, is set as the transmission frequency for the data transmission at the control device and/or the pump assembly. Alternatively, the control device and/or the pump assembly may automatically determine the frequency region, which is dependent on the applied filter, for the data transmission. This may be effected, for example, by way of the pump assembly and/or the control device firstly sampling several frequency regions for the data transmission, and ascertaining in which region a data transmission without problem is possible. One may also provide a unit which analyses the frequency spectrum of the carrier signal and determines the region in which less disturbances occur and then sets the communication modules of the control device and pump assembly, such that the data transmission takes place precisely in this frequency region.

The invention further relates to a pump system for carrying out the previously described method for data transmission between a pump assembly and a spatially separated control device. The pump system thus comprises a pump assembly and a control device which is spatially separated from this, so that the pump assembly may, for example, be sunk into a pump sump or drill hole as a submersible pump, and the control device may be arranged outside on the surface. The pump assembly has an electrical supply lead which is provided for connection to a frequency converter, for the supply with electrical energy. The rotational speed of the pump is controlled via the frequency converter by way of adapting the frequency of the supply voltage in the supply lead. According to the invention, the pump assembly and the control device comprise additional communication modules which permit a data transmission between the pump assembly and the control device in one or two directions, i.e., from the pump assembly to the control device and/or from the control device to the pump assembly. The communication modules are designed such that the data transmission may be effected via the supply lead, i.e., the communication modules are in connection with one another via the supply lead for data transmission. A separate data lead is thus avoided.

The data transmission signal is modulated upon the carrier signal in the supply lead, which is the output signal of the frequency converter. Thereby, the data transmission is effected such that an evaluation of a data transmission signal received by one of the communication modules is only effected in low-disturbance regions of a carrier signal formed by a supply current or a supply voltage. Thereby, the data transmission itself, i.e., the transmitting, may indeed be effected such that the data are only sent in low-disturbance regions of the carrier signal, and accordingly then also only evaluated in these regions. Alternatively, a continuous transmission or a continuous sending may be effected, and the evaluation of the data transmission is effected only in the regions in which the carrier signal is disturbance-free or has a low disturbance. A separation between disturbances and transmitted data is possible in this manner, as has been described above by way of the method. Thereby, with regard to the disturbance-free or low-disturbance regions, it may be the case of temporal regions or frequency regions of the carrier signal.

Accordingly, according to a first preferred embodiment, the pump system is set up in a manner such that the communication and/or the evaluation of the data transmission signal is deferred in the time of occurring disturbances in the carrier signal. That is, either no data are sent, or the receipt or the evaluation of the sent data transmission signal is deferred during the time period in which disturbances occur. In this manner, one ensures that the transmitted data may be received without errors.

Preferably, at least one of the communication modules comprises a signal analyzer, in particular in the form of a frequency analyzer or a phase detector, for the recognition of disturbances of the carrier signal. In this manner, it is possible to automatically recognize disturbances in the carrier signal, and to accordingly adapt or defer the data transmission, in order to be able to receive data without errors. Thus, the communication modules may operate independently of the applied frequency converter, since they may automatically recognize the occurring disturbances. For example, this may be effected by superimposing a reference signal and a modulated signal, wherein the phase shift on account of the disturbances is detected.

According to a further preferred embodiment, the communication modules are designed in a manner, such that a communication between the communication modules, i.e., a data transmission, is effected in a frequency range, in which the harmonics of the carrier signal formed by the supply current are damped. That is, the data transmission signal which is modulated upon the carrier signal in the supply lead is set to a frequency range in which the harmonics of the carrier signal experience a large damping. Preferably, an electrical filter for damping the harmonics is arranged between the frequency converter and the control device. Such a filter is often applied anyway with the application of frequency converters, as has already been described above, in order to damp disturbing harmonics. In this manner, one creates a frequency range which is low in disturbance, and may be used for data transmission. Thus, it is merely necessary to adapt the data transmission to the applied filter with regard to the selected frequency range, in order to set the data transmission into the region in which the filter offers the greatest damping.

This may be effected, for example, by way of the frequency region for the communication to the control device and/or to the pump assembly being able to be set. This means that the user takes note of what kind of filter is applied in the supply lead, and then, via setting means, i.e., a switch on the control device and/or the pump assembly, manually sets the desired frequency region for the data transmission. Alternatively, at least one of the communication modules in the control device or the pump assembly may be used for automatic evaluation of the frequency region for the communication. For example, this may be effected in that a communication module, e.g., that of the pump assembly, samples successively different frequency regions for data transmission to the control device, and waits for a reply signal from the other communication module, e.g., the control device, and then sets that frequency region, at which the reply signal has been received. Alternatively, one of the communication modules may comprise a signal evaluation means for signal evaluation of the carrier signal, and by way of the signal evaluation, determine the frequency region in which minimal disturbances in the form of harmonics are formed.

The control device preferably comprises a signal transformer for the inductive or capacitive signal transmission between the supply lead and the communication module of the control device. In this manner, the data transmission signals to be transmitted may be easily modulated upon the carrier signal in the supply lead, without the complete electrical supply power having to be transmitted by the electronics of the control device. Preferably, a suitable inductive or capacitive coupling of the signal may also be effected in the pump assembly.

Since the described pump system realizes the previously described method, it is to be understood that features, which have only been described by way of the method, may also be applied to the pump system, and correspondingly, method steps, which have only been explained in the context of the pump system, may also generally be applied with the described method.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 2 is a diagrammatic representation of the function of the filter shown in FIG. 1;

DETAILED DESCRIPTION OF THE INVENTION

Figure 1:
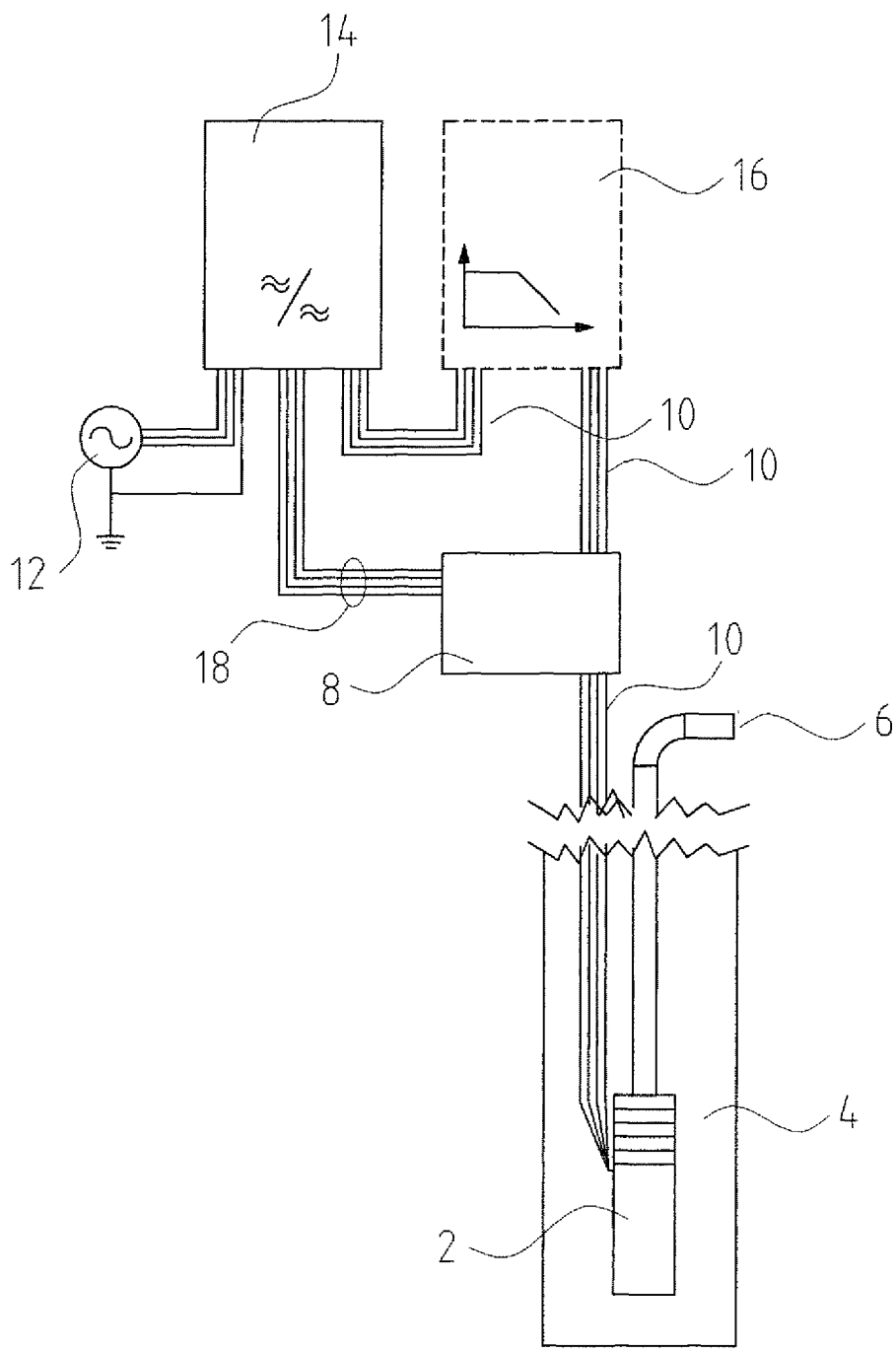
FIG. 1 is a schematic overall view of a pump system according to one embodiment of the invention.

The overall construction of a pump system according to an embodiment of the invention is explained by way of FIG. 1. The pump system comprises a submersible pump 2, which is arranged in a pump sump 4 in a manner known per se. There, a pressure conduit 6 extends out of the pump sump 4 to the surface. Furthermore, the pump system comprises a control device 8 for controlling the pump assembly 2, which is likewise arranged outside the pump sump 4, i.e., spatially distanced from the pump assembly 2. Due to the spatially distanced arrangement of the control device 8 and the pump assembly 2, a data transmission between both is necessary, in order to be able to transmit condition data, which are acquired in the pump assembly 2, for example pressure, temperature, etc., to the control device 8. According to the invention, for this purpose, no separate data lead is provided for the data transmission between the pump assembly 2 and the control device 8 or, vice versa, from the control device 8 to the pump assembly 2. Rather, the communication between the control device 8 and the pump assembly 2 is effected by way of a data transmission or signal transmission via the supply lead 10.

The supply lead 10 provides the electrical energy to the pump assembly 2. The energy supply of the pump assembly 2 is effected, proceeding from an electricity supply 12, via a frequency converter 14. At the output side of the frequency converter 14, the supply lead 10 runs to the pump assembly 2, wherein, in the shown example, a filter 16 for damping undesired harmonics is yet arranged in the supply lead 10. This disturbance frequency or these harmonics arise due to the switching on and off of the power switches of the frequency converter 14. These disturbance frequencies are, however, undesirable on operation of the pump assembly 2, since these only lead to a heating of the motor windings.

The control device 8 is connected to the supply lead 10 in a manner that a signal transformer is provided here, via which signals are coupled from the control device 8 into and out of the supply lead 10. Here, an inductive coupling is effected, but a capacitive coupling is also possible as an alternative. That is, the supply lead 10 is not interrupted in the control device 8, but here merely runs through the inductive or capacitive coupling-in means.

The control device 8 is, furthermore, connected via a control lead 18 to the frequency converter 14 for its control. This control device 8 may instruct the frequency converter 14 as to which frequency of the supply voltage or supply current is to be selected, in order to provide a certain rotational speed or power of the pump assembly 2.

The manner of functioning of the filter 16 is further explained in more detail by way of FIG. 2. Further, the filter 16 is shown schematically at the top in FIG. 2. The filter characteristics are described by way of the diagrams a, b and c. The amplitude A is plotted against the frequency f in the diagrams. Thus the filter, as represented in diagram a, acts principally as a low-pass, i.e., all frequencies above the limit frequency f1 are damped, while the lower frequencies are admitted. These lower frequencies are the operating frequencies of the motor of the pump assembly 2. All undesired higher frequencies are damped above the limit frequency f1.

However, the filter as shown in the diagram b simultaneously has the side effect, that higher frequencies above a second limit frequency f2 are again admitted, or damped to a lesser extent. Thus, the filter as a whole has a filter characteristic as is represented in diagram c. Here, one may recognize that it sets a frequency f3 at which the filter has its greatest damping. This is precisely the region which is suitable for the data transmission via the supply lead 10, since disturbance frequencies are largely eliminated in this region. For this reason, according to the invention, according to a first embodiment of the invention, the data transmission in this region is set to the frequency f3, in which the filter has its greatest filtering effect. The control device 8 as well as the pump assembly 2 must therefore be set accordingly, so that their communication is effected in this desired frequency region. This may be effected by way of manual setting. Thus, switches for the selection of certain frequency regions may be provided on the pump assembly 2 and/or the control device 8. Alternatively, this frequency region may be determined automatically. Thus, for example, the pump assembly 2, or a communication module of the pump assembly 2, may first attempt to send signals to the control device 8 at several frequencies. If this device receives one of the signals, the control device 8 or its communication module may then send a confirmation signal at the same frequency to the pump assembly 2, so that the electronics in the pump assembly 2 may then ascertain that a disturbance-free data-transmission is possible in this frequency region. That is, several predefined frequencies are sampled one after the other. Alternatively, one may also provide an electronic frequency analyzer which determines the region of the lowest disturbances and then sets the transmission frequency to this region in an automated manner.

This method of data transmission explained by way of FIG. 2 is thus based on the idea of letting the data transmission take place in a frequency region, in which as few as possible disturbances occur. Thereby, there is the advantage that such a frequency region with minimal disturbances is given anyway, on account of a filter which is mostly applied in any case, so that the data transmission only needs to be set in this frequency region.

A second alternative of the data transmission according to the invention, which may also be used in combination with the previously described method, is to let the data transmission take place in a time interval, in which no disturbance frequencies occur. This is explained hereinafter by way of FIGS. 3 to 6.

Figure 3:
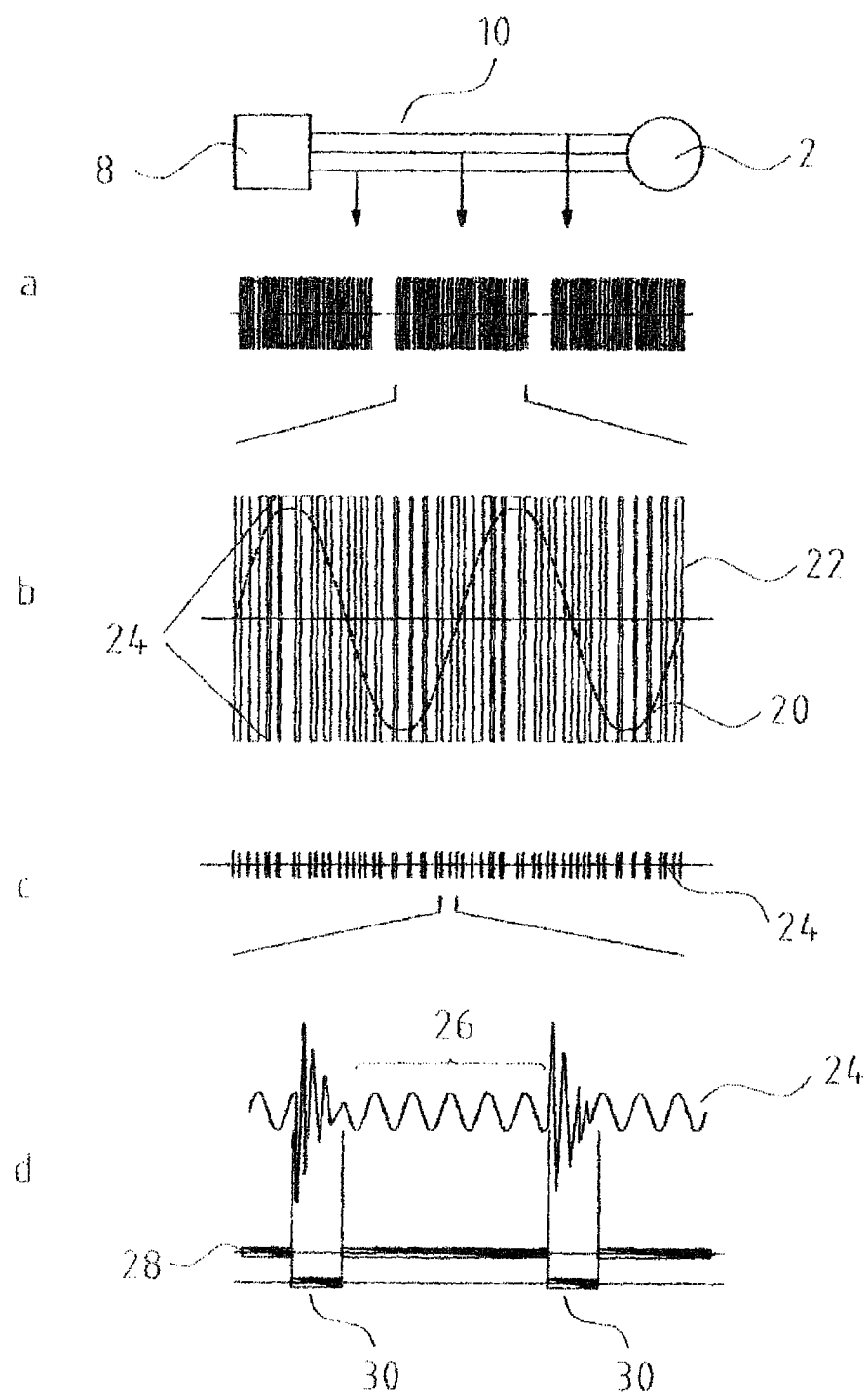
FIG. 3 is a diagrammatic representation of the function of the data transmission according to a second embodiment of the invention, by way of the frequency course.

The connection between the control device 8 and the pump assembly 2 via the supply lead 10 is once again shown schematically at the top in FIG. 3. Various frequency courses are illustrated below this. Generally, the frequency course in the supply lead, i.e., the output signal of the frequency converter 14, is represented in row a. This is shown enlarged yet again in row b in a cut-out. The course of the voltage is shown over time in the diagram. The pump assembly 2 is basically to be operated with a sinusoidal voltage 20. The rotational speed of the pump assembly 2 and thus the delivery power may be set via the selection of the frequency. In order to be able to change the frequency, the frequency converter 14 carries out a multitude of switch procedures in a known manner, by which the power transmission signal 22 is produced. As a mean, the voltage signal 20 with a sinusoidal course is approximated by the power transmission signal 22 or its changing period intervals, and this sinusoidal course represents the operating frequency of the motor of the pump assembly 2.

The data transmission on the power transmission signal 22, which serves as a carrier signal, may always only be effected during the switch-on phase as a superimposed data transmission signal 24, wherein the polarity of the carrier signal, i.e., of the power transmission signal 22, continuously changes due to the switching on and off of the power switches. Row c in FIG. 3 shows the extracted data transmission signal 24 independently of the polarity of the carrier signal.

The row d once again shows a cut-out of this data transmission signal 24. Here, one may recognize that disturbances 26 in the frequency course of the data transmission signal 24 occur exactly at the switching points of the power switches, i.e., when the power transmission signal 22 changes its polarity. These are precisely the regions in which the data transmission is to be deferred or interrupted. Thus, the bar 28 characterizes the time intervals, in which the data transmission takes place, and the bar 30 characterizes the time intervals, in which the data transmission is deferred. This deferring may either be effected by way of already interrupting the sending of the data in these regions, when the positions of the disturbances may be recognized at the beginning, for example by the control device 8. However, it is particularly preferable for the receiver, i.e., either the electronics in the pump assembly 2 or the control device 8, depending on the direction of the data transmission, to recognize the disturbances and to defer the receipt or the evaluation of the transmitted data transmission signal 24.

Figure 4:
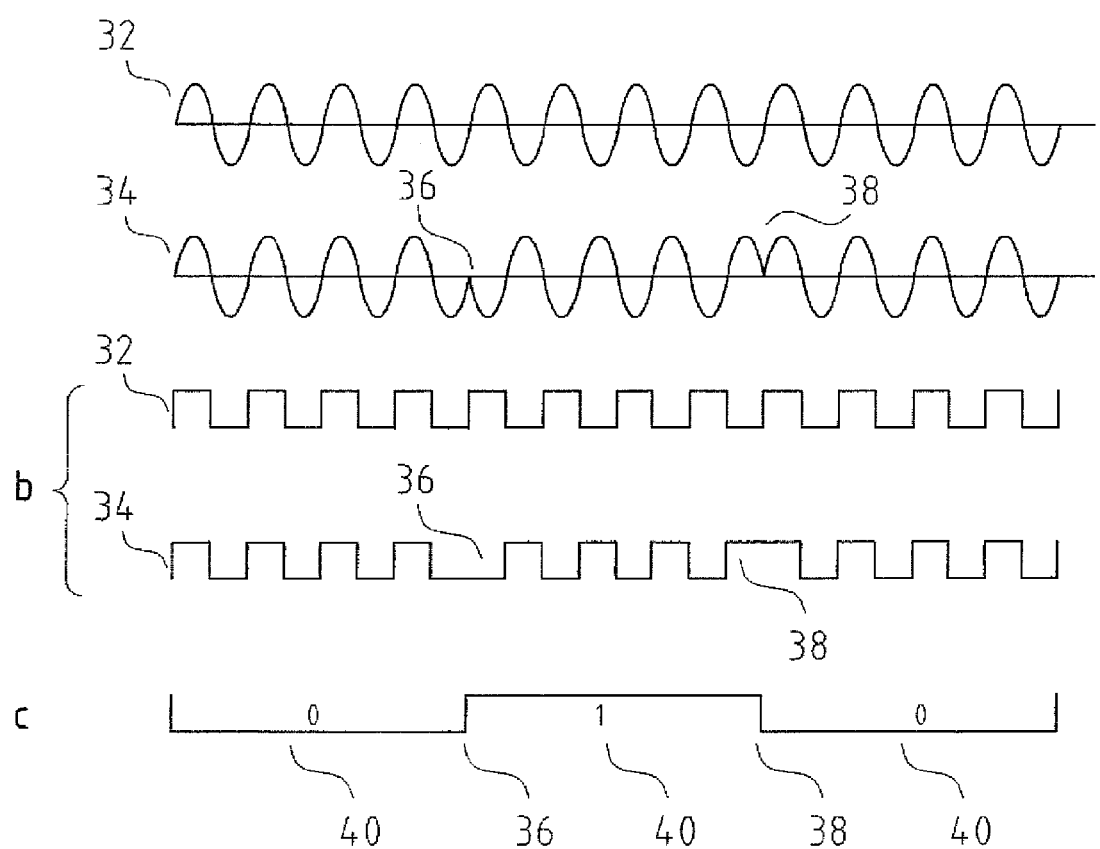
FIG. 4 is a diagrammatic representation of a modulation principle.

The way and manner of the data transmission is explained in further detail by way of FIG. 4. Preferably, the data transmission is effected according to the modulation principle of coding by way of phase shift keying (PSK). Starting from a reference signal 32 with a constant frequency and amplitude, a modulated signal 34 is produced, wherein a phase shift by half a wavelength takes place in each case at the points at which a polarity change from one transmitted bit to the next bit is to take place, i.e., at the starting points 36 and end points 38 of a bit. That is, a digital data transmission is effected, wherein each bit is defined by several periods, preferably 256 oscillations. The evaluation with the data transmission is effected solely by way of detecting the zero crossings, as is represented in the rows b in FIG. 4. Here, one may recognize that in each case there is a longer half-period with the same polarity at the points in time 36 and 38, when the described phase shift occurs in the modulated signal 34. These longer half-periods or phase shifts characterize the change of a polarity of a bit 40. Thus, in the shown example, a change from 0 to 1 at the point in time 36, and again a change from 1 to 0 at the point in time 38 may be recognized in row c in FIG. 4. The length of a bit thereby is only set by the previously fixed number of periods or zero-crossings. That is, if two bits with the same polarity were to occur consecutively, no phase shift would occur in the modulated signal 34, as is shown at the points in time 36 and 38.

The evaluation of the signal transmission is explained further in more detail by way of FIG. 5, in which again the reference signal 32 and the modulated signal 34 are shown at the top merely in the form of the zero-crossings. A validated reference signal 32' as well as a validated modulated signal 34' are shown therebelow. Given a constant period interval of the signals 32 and 34, these signals in each case have a constant value, and only the points in time of the phase shifts 36 and 38 cause an amplitude in the validated, modulated signal 34'. A phase detection signal 42 is produced by way of superimposing or subtracting of the reference signal 32 as well as the modulated signal 34, and this phase detection signal represents the phase shift between the reference signal 32 as well as the modulated signal 34. Here, one may recognize that between the points in time 36 and 38, a phase shift by half a wavelength is given, compared to the regions before the point in time 36 and after the point in time 38. This phase shift characterizes the polarity change of a bit 40, whose length is set by the set number of periods between the points in time 36 and 38.

Figure 5:
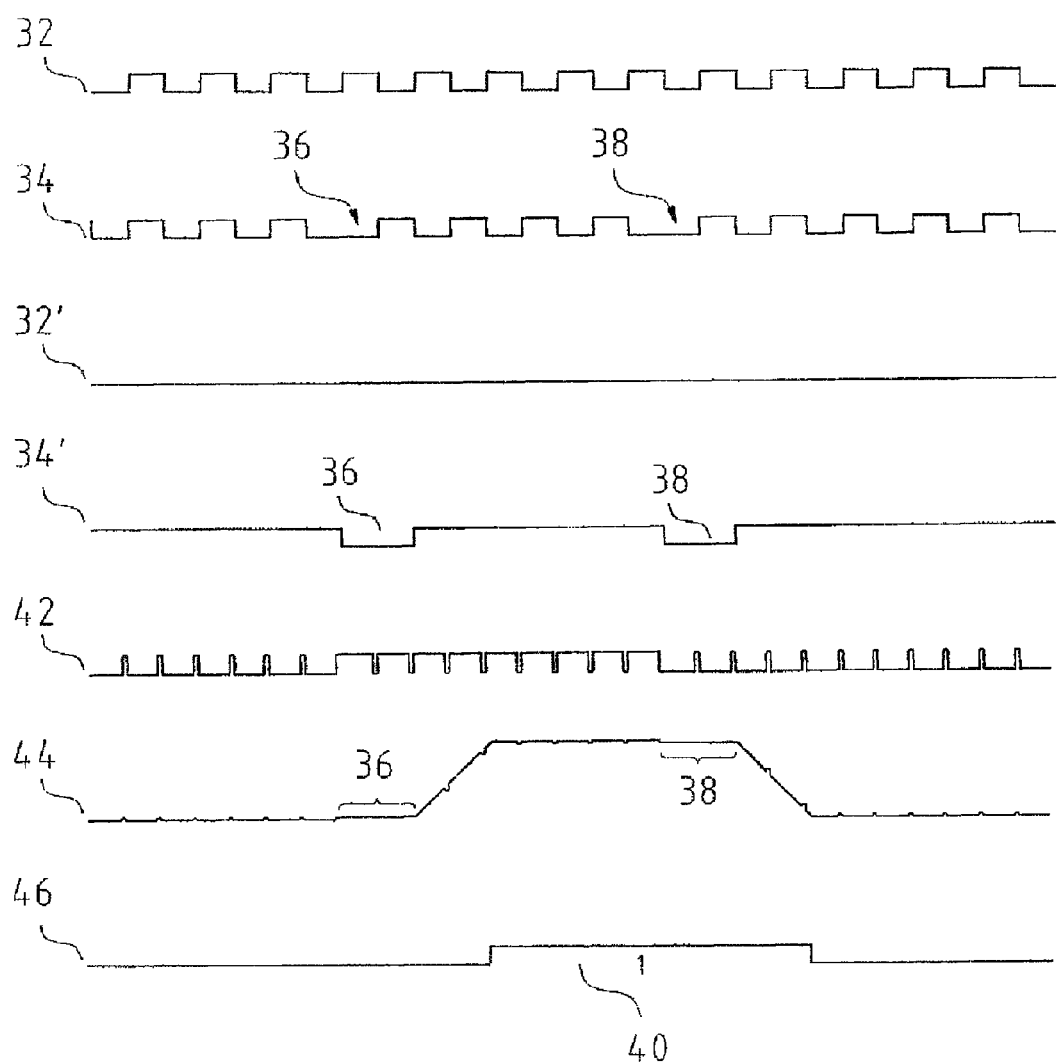
FIG. 5 is a diagrammatic representation of the signal evaluation without disturbance.

A filtered signal 44 is represented next in FIG. 5, with which one may recognize that the small phase shifts in the signal of the phase detection 42 are filtered away, and likewise also the disturbances occurring in the frequency course which occur due to the phase shift at the points in time 36 and 38. Finally, a demodulated bit sequence 46 is shown at the very bottom in FIG. 5, which permits the recognition of the polarity change of a bit 40 between the points in time 36, wherein here, a temporal offset is given due to the evaluation and the filtering. No evaluation is effected at the points in time 36 and 38.

The evaluation which has been described by way of FIG. 5 is effected without the occurrence of disturbance frequencies in the carrier signal. Now, the evaluation, while taking disturbance frequencies into account, is described by way of FIG. 6. These disturbances 26 are shown in the first row at the top in FIG. 6. Again, the rows below show the reference signal 32 as well as the modulated signal 34 as well as the validated reference signal 32' as well as the validated, modulated signal 34'. Here, one may recognize that, apart from the phase shifts at the points in time 36 and 38, phase disturbances 48 occur in the reference signal 32 as well as the modulated signal 34 on account of the disturbances 26 in the carrier signal. These phase disturbances may also be recognized in the course of the validated signals 32' and 34'.

The inventive evaluation of the data transmission signal 34 is effected in a manner such that the data transmission or the evaluation of the data transmission signal 34 are deferred at the points in time 48 in which the disturbances 26 of the carrier signal occur, in a manner such that here no polarity change of one bit to the next is detected. This is effected in a manner such that the temporal regions in which disturbances 26 occur may be recognized by way of the validated reference signal 32', which has a constant course in the region without disturbances. The validated reference signal only has a polarity change at the locations at which no constant frequency course is given because of occurring disturbances 26. The evaluation of the data transmission is deferred in these regions 48, i.e., also no phase shifts of the modulated signal 34, which could point to a polarity change of a bit, are evaluated during these times. Thus, the phase-shifted regions 50 of the validated, modulated signal 34' are not evaluated as a polarity change of a bit, because they fall into the regions 48, in which disturbances have been ascertained on account of the phase course of the reference signal 32. Thereby, a three-conductor system offers the advantage that the reference signal 32 as well as the modulated signal 34 may be transmitted in the supply lead 10 to the pump assembly 2, so that both signals are available for a signal evaluation. However, it is also possible to compute the reference signal 32 from the modulated signal 34.

The evaluation of the data transmission is deferred in the regions 48 burdened by disturbances, in a manner such that the counting of the zero-crossings of the signal of the phase detection 42 is deferred in these temporal regions as well as in the regions or points of time 36 and 38 at which the phase shift sets in, so that only after the end of these temporal regions are the deflections on account of the phase shift of the signal of the phase detection 42, continued to be counted, in order after a certain number of zero-crossings, to ascertain the end of a bit and to test whether a change of polarity of the bit has occurred here. Thus, as with the demodulated bit sequence 46 shown in FIG. 6, a temporal delay of the recognition of the polarity change of a bit 40 occurs, but the bit may be recognized without any error, since the occurring disturbances 26 in the carrier signal 22 are thus ignored. The curve 44 in FIG. 6 again shows a filtered signal, with which one may recognize that the changes of the phase shift between the modulated signal 34 and the reference signal 32, which occur in the temporal regions 36, 38 and 48, are not taken into account.

As explained by way of FIG. 4, the coding is effected by change of the phase shift between a reference signal 32 and a modulated signal 34. Accordingly, even the recognition of disturbances is effected by way of the evaluation of the phase shifts between the modulated signal 34 and the reference signal 32. For this purpose, an evaluation of the validated reference signal 32' as well as of the validated, modulated signal 34' is effected. The signal evaluation is deferred in the regions, in which these two signals have no constant value. These are regions in which the modulated signal 34 as well as the reference signal 32 have no constant phase course, but changes or disturbances of the phase course occur due to the disturbances 26 or the coding at the points in time 36 and 38. As is to be seen by way of the filtered signal 44 in FIG. 6, the evaluation of the phase detection signal 42 is deferred at these points in time 36, 38 and 48, i.e., here the counting of the oscillations or periods of the signal and the polarity recognition is deferred.

Figure 6:
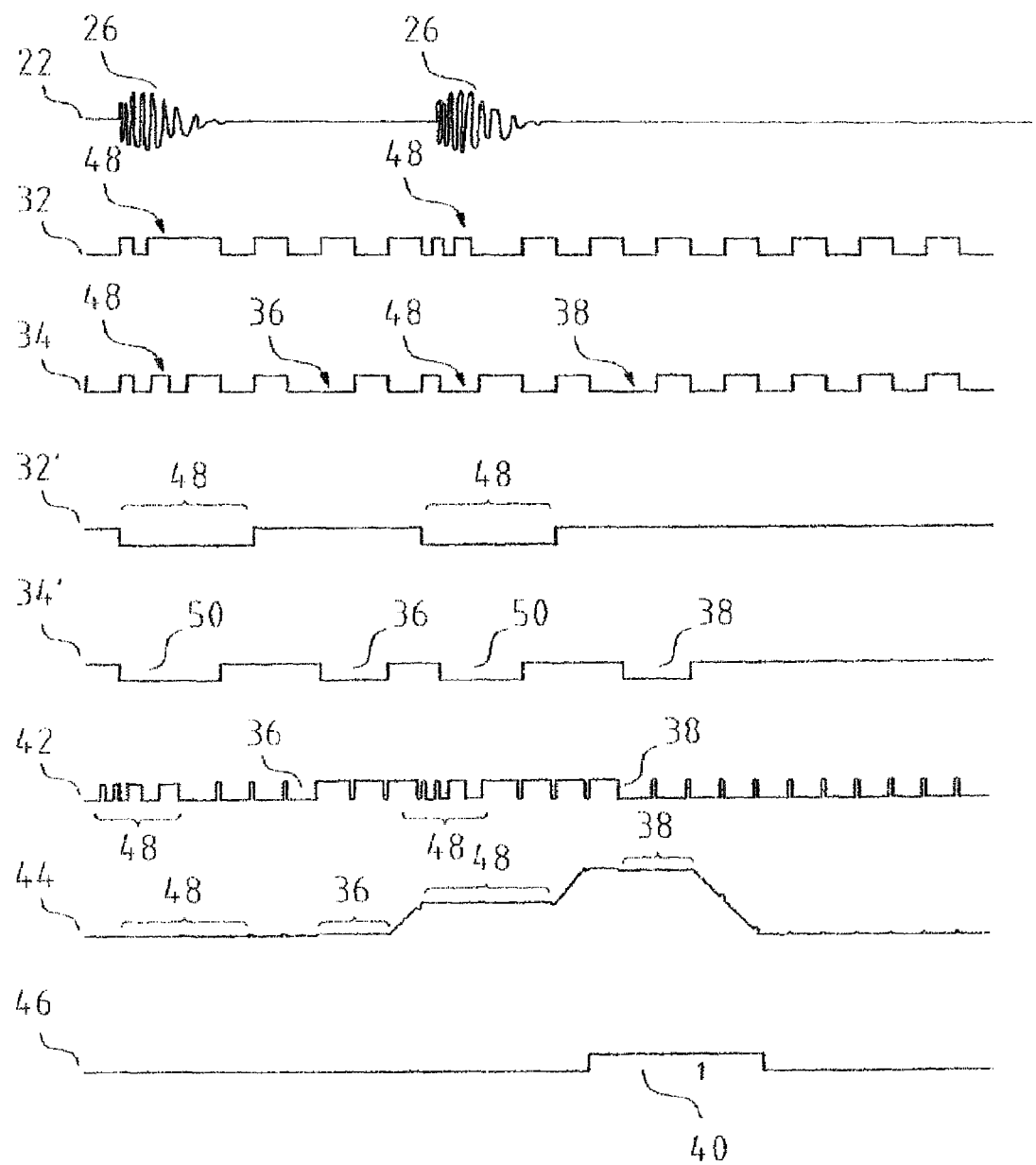
FIG. 6 is a diagrammatic representation of the signal evaluation with disturbances.

One may recognize in FIG. 6 that the disturbance may alternatively be effected by overall consideration of the signal course of the phase detection signal 42, which represents a superposition of the modulated signal 34 and the reference signal 32. One may recognize that the change of the phase shift in the regions 48 is significantly shorter than the time marking a bit between the points in time 36 and 38. Thus, one may eliminate the disturbances 36 which are relatively short in comparison to the temporal duration of a bit 40 also on account of the difference in the time duration, by way of suitable evaluation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A pump system comprising a pump assembly including a submersible pump arranged below a surface and a control device which is spatially separated from the pump assembly and arranged outside on the surface, wherein the pump assembly comprises at least one electrical supply lead connected to a frequency converter arranged outside on the surface, the frequency converter outputting the power supply to the submersible pump, wherein the pump assembly and the control device comprise communication modules, the modules being in communicating connection with one another for continuous data transmission of a digital data transmission signal via the supply lead, the digital data transmission signal including condition data acquired by the pump assembly for transmission to the control device, and the modules being designed in a manner such that an evaluation of a digital data transmission signal received by one of the communication modules is only effected in low-disturbance regions of a carrier signal formed by a supply voltage such that disturbances in the carrier signal whose temporal duration is smaller than a temporal duration of a smallest information unit to be transmitted in a course of data transmission of the digital data transmission signal are ignored during the evaluation, wherein the digital data transmission signal is modulated upon the carrier signal, and wherein the evaluation of the digital data transmission signal is deferred in moments of switching on and off of power switches of the frequency converter and the continuous data transmission is effected regardless of disturbances in the carrier signal caused by the switching on and off of power switches of the frequency converter.

2. The pump system according to claim 1, wherein the pump system is set up in a manner such that evaluation of the digital data transmission signal is deferred in a time of occurring disturbances of the carrier signal.

3. The pump system according to claim 1, wherein the communication modules comprise a signal interruption means which defers the evaluation of the digital data transmission signal in times in which disturbances of the carrier signal occur.

4. The pump system according to claim 1, wherein at least one of the communication modules contains a signal analyzer having a form of a frequency analyzer or phase detector for recognizing disturbances of the carrier signal.

5. The pump system according to claim 1, wherein the communication modules are designed in a manner such that a communication between the communication modules is effected in a frequency region in which harmonics of the carrier signal formed by a supply current are damped, and wherein an electrical filter arranged between the frequency converter and the control device is provided for damping the harmonics.

6. The pump system according to claim 5, wherein the frequency region for the communication may be set at at least one of the control device and the pump assembly, wherein at least one of the communication modules is designed for automatic evaluation of the frequency region for the communication.

7. The pump system according to claim 1, wherein a signal transformer for inductive or capacitive signal transmission between the supply lead and at least one of the communication modules of the control device is arranged in the control device.

8. The pump system of claim 1, wherein the condition data includes at least one of temperature data or pressure data.

* * * * *